(12) United States Patent
Zheng et al.

(10) Patent No.: US 9,769,735 B2
(45) Date of Patent: Sep. 19, 2017

(54) CELL SELECTION AND RESELECTION OPTIMIZATIONS RESPONSIVE TO MOBILITY STATE

(71) Applicant: Avago Technologies General IP (Singapore) Pte. Ltd., Singapore (SG)

(72) Inventors: Dong Zheng, Sunnyvale, CA (US); Vikram Shantveer Mhetre, San Jose, CA (US); Aniruddha Subhash Diwan, Cupertino, CA (US); Rishi Ranjan, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 61 days.

(21) Appl. No.: 14/132,266

(22) Filed: Dec. 18, 2013

(65) Prior Publication Data

US 2015/0024743 A1  Jan. 22, 2015

Related U.S. Application Data

(60) Provisional application No. 61/900,511, filed on Nov. 6, 2013, provisional application No. 61/847,237, filed on Jul. 17, 2013, provisional application No. 61/859,874, filed on Jul. 30, 2013, provisional application No. 61/867,298, filed on Aug. 19, 2013.

(51) Int. Cl.
*H04W 4/00* (2009.01)
*H04W 48/16* (2009.01)
*H04W 8/18* (2009.01)
*H04W 84/04* (2009.01)

(52) U.S. Cl.
CPC .............. *H04W 48/16* (2013.01); *H04W 8/18* (2013.01); *H04W 84/045* (2013.01)

(58) Field of Classification Search
CPC ..... H04W 48/16; H04W 60/00; H04W 36/30; H04W 36/04
USPC .............................. 455/434, 435.1, 436, 444
See application file for complete search history.

(56) References Cited

U.S. PATENT DOCUMENTS

| 2005/0009548 | A1* | 1/2005 | Kelley et al. ................. 455/509 |
| 2010/0099449 | A1* | 4/2010 | Borran et al. ................ 455/501 |
| 2011/0201354 | A1* | 8/2011 | Park .................... H04W 84/047 455/456.1 |
| 2011/0212724 | A1* | 9/2011 | Wirtanen ............. H04W 88/02 455/435.2 |
| 2011/0263252 | A1* | 10/2011 | Saini et al. .................... 455/434 |
| 2011/0300866 | A1* | 12/2011 | Ali et al. ...................... 455/436 |

(Continued)

OTHER PUBLICATIONS

3GPP TS 36.304 v10.6.0 (Jun. 2012) Technical Specification; User Equipment (UE) procedures in idle mode, 3GPP, Valbonne, France, 2012, 33 pages.

(Continued)

*Primary Examiner* — Anthony Addy
*Assistant Examiner* — Matthew Genack
(74) *Attorney, Agent, or Firm* — Foley & Lardner LLP (57) ABSTRACT

User equipment (UE) obtains system information using a foreground or background process. The system information may include cell information that distinguishes femtocells from macrocells. Given this cell information, the UE may avoid tuning to or attempting to connect to cell types that the UE does not support. For instance, the UE may avoid connection attempts to femtocells, when the UE does not support femtocell connections.

20 Claims, 5 Drawing Sheets

(56) References Cited

U.S. PATENT DOCUMENTS

| | | | | |
|---|---|---|---|---|
| 2013/0010753 | A1* | 1/2013 | Chen et al. | 370/331 |
| 2013/0303199 | A1* | 11/2013 | Siomina | H04W 64/00 |
| | | | | 455/456.5 |
| 2014/0066074 | A1* | 3/2014 | Folke | H04W 36/08 |
| | | | | 455/437 |
| 2014/0092758 | A1* | 4/2014 | Suzuki | H04W 48/18 |
| | | | | 370/252 |
| 2014/0171091 | A1* | 6/2014 | Cai | H04W 48/20 |
| | | | | 455/450 |

OTHER PUBLICATIONS

3GPP TS 36.331 v10.11.0 (Sep. 2013 Technical Specification; Evolved Universal Terrestrial Radio Access (E-UTRA) Radio Resource Control (RRC), 3GPP, Valbonne, France, 2013, 308 pages.

Section 5.2.4.3 Mobility States of a UE, 3GPP TS 36.304 v10.6.0 (Jun. 2012) Technical Specification; User Equipment (UE) procedures in idle mode, 3GPP, Valbonne, France, 2012, 1 page.

Section 5.5.6.2, Speed dependant scaling of measurement related parameters, 3GPP TS 36.331 v10.11.0 (Sep. 2013 Technical Specification; Evolved Universal Terrestrial Radio Access (E-UTRA) Radio Resource Control (RRC), 3GPP, Valbonne, France, 2013, 2 pages.

Kwak, H., et al., Mobility Management Survey for Home-eNB Based 3GPP LTE Systems, Journal of Information Processing Systems, vol. 4, No. 4, Dec. 2008, 8 pages.

UMTS frequency bands downloaded from Wikipedia (http://en.wikipedia.org/wiki/UMTS_frequency_bands), Nov. 9, 2013, 6 pages.

* cited by examiner

CELL SELECTION AND RESELECTION OPTIMIZATIONS RESPONSIVE TO MOBILITY STATE

PRIORITY CLAIM

This application claims priority to: U.S. Provisional Application Ser. No. 61/900,511, filed 6 Nov. 2013, U.S. Provisional Application Ser. No. 61/847,237, filed 17 Jul. 2013, U.S. Provisional Application Ser. No. 61/859,874, filed 30 Jul. 2013, and U.S. Provisional Application Ser. No. 61/867,298, filed 19 Aug. 2013, all of which are entirely incorporated by reference.

TECHNICAL FIELD

This disclosure relates to femtocells and facilitating wireless communication device connection to femtocells.

BACKGROUND

Rapid advances in communication technologies, driven by immense customer demand, have resulted in the widespread adoption of mobile communication devices. Many of these devices, e.g., smartphones, have sophisticated wireless connectivity options. In addition to fundamental voice call connectivity with base stations serving very large numbers of subscribers is another connection option: connecting to femtocells within, e.g., a 3G network. The femtocells typically support fewer subscribers, but may provide call quality, cost, bandwidth, or other advantages to those subscribers.

DETAILED DESCRIPTION

Figure 1:
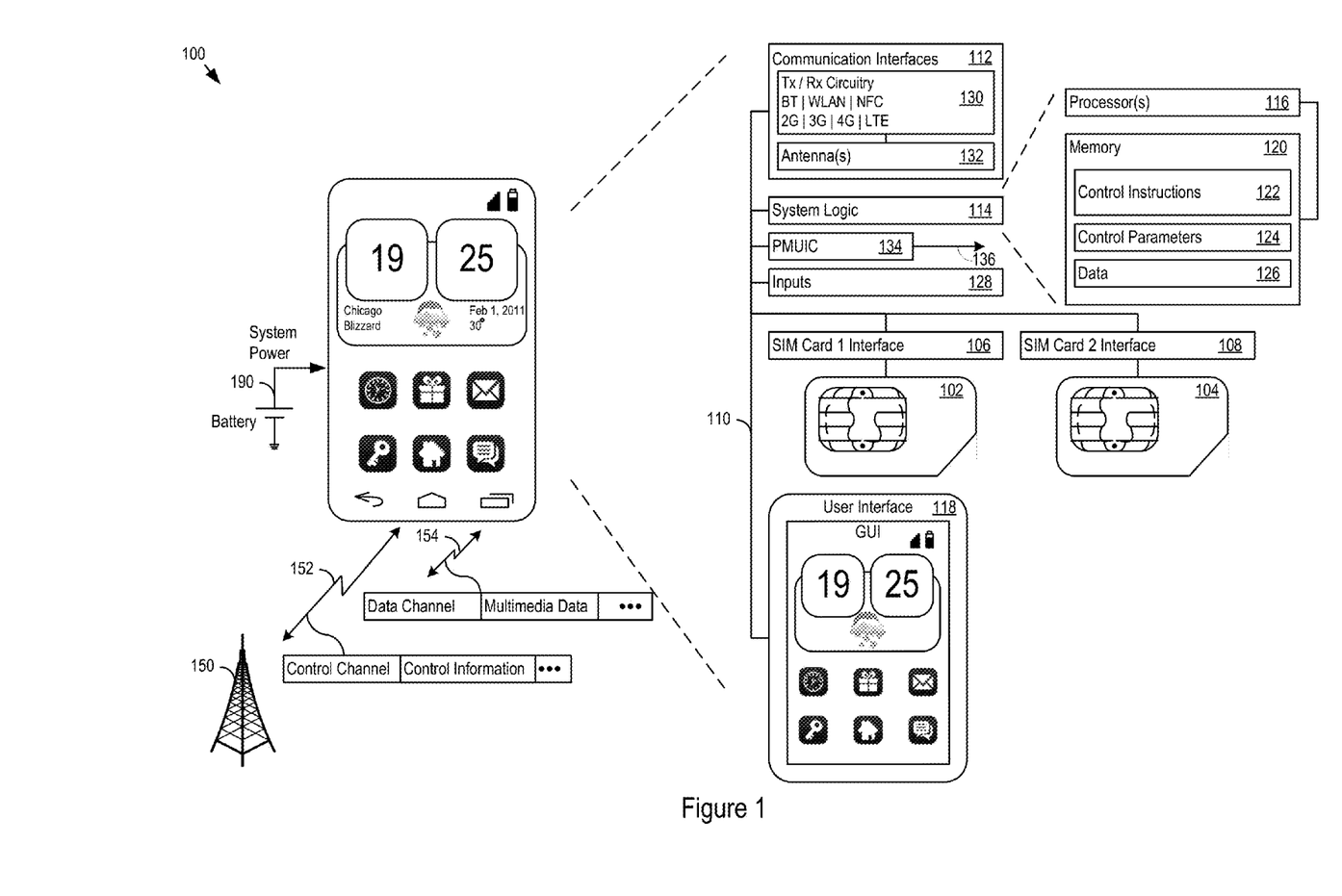
FIG. 1 shows an example of user equipment.

FIG. 1 shows an example of user equipment 100 ("UE 100"). The UE 100 is a smartphone in this example, but the UE may be any electronic device. The techniques described below regarding femtocells may be implemented in a wide array of different types of devices. Accordingly, the smartphone example described below provides just one example context for explaining the femtocell connection and communication techniques.

As one example, UE may be a 2G, 3G, or 4G/LTE cellular phone capable of making and receiving wireless phone calls, and transmitting and receiving data using 802.11 a/b/g/n/ac/ad ("WiFi"), Bluetooth (BT), Near Field Communications (NFC), or any other type of wireless technology. The UE may also be a smartphone that, in addition to making and receiving phone calls, runs any number or type of applications. UE may, however, be virtually any device that transmits and receives information, including as additional examples a driver assistance module in a vehicle, an emergency transponder, a pager, a satellite television receiver, a networked stereo receiver, a computer system, music player, or virtually any other device.

FIG. 1 shows an example of the UE 100 in communication with a network controller 150, such as an enhanced Node B (eNB) or other base station. The network controller 150 and UE 100 establish communication channels such as the control channel 152 and the data channel 154, and exchange data. In this example, the UE 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The UE 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), discrete analog and digital circuits, and other circuitry. The system logic 114 is part of the implementation of any desired functionality in the UE 100. In that regard, the system logic 114 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 and the inputs 128 may include a graphical user interface, touch sensitive display, voice or facial recognition inputs, buttons, switches, speakers and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 114 may include one or more processors 116 and memories 120. The memory 120 stores, for example, control instructions 122 that the processor 116 executes to carry out desired functionality for the UE 100. The control parameters 124 provide and specify configuration and operating options for the control instructions 122. The memory 120 may also store any BT, WiFi, 3G, or other data 126 that the UE 100 will send, or has received, through the communication interfaces 112. The UE 100 may include a power management unit integrated circuit (PMUIC) 134. In a complex device like a smartphone, the PMUIC 134 may be responsible for generating as many as thirty (30) different power supply rails 136 for the circuitry in the UE 100.

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 112 may include transceivers that support transmission and reception under the 2G, 3G (e.g., Universal Mobile Telecommunications System (UMTS) or High Speed Packet Access (HSPA)+ operation), BT, WiFi, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

As just one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the UE 100, are available from Broadcom Corporation of Irvine Calif.

Figure 2:
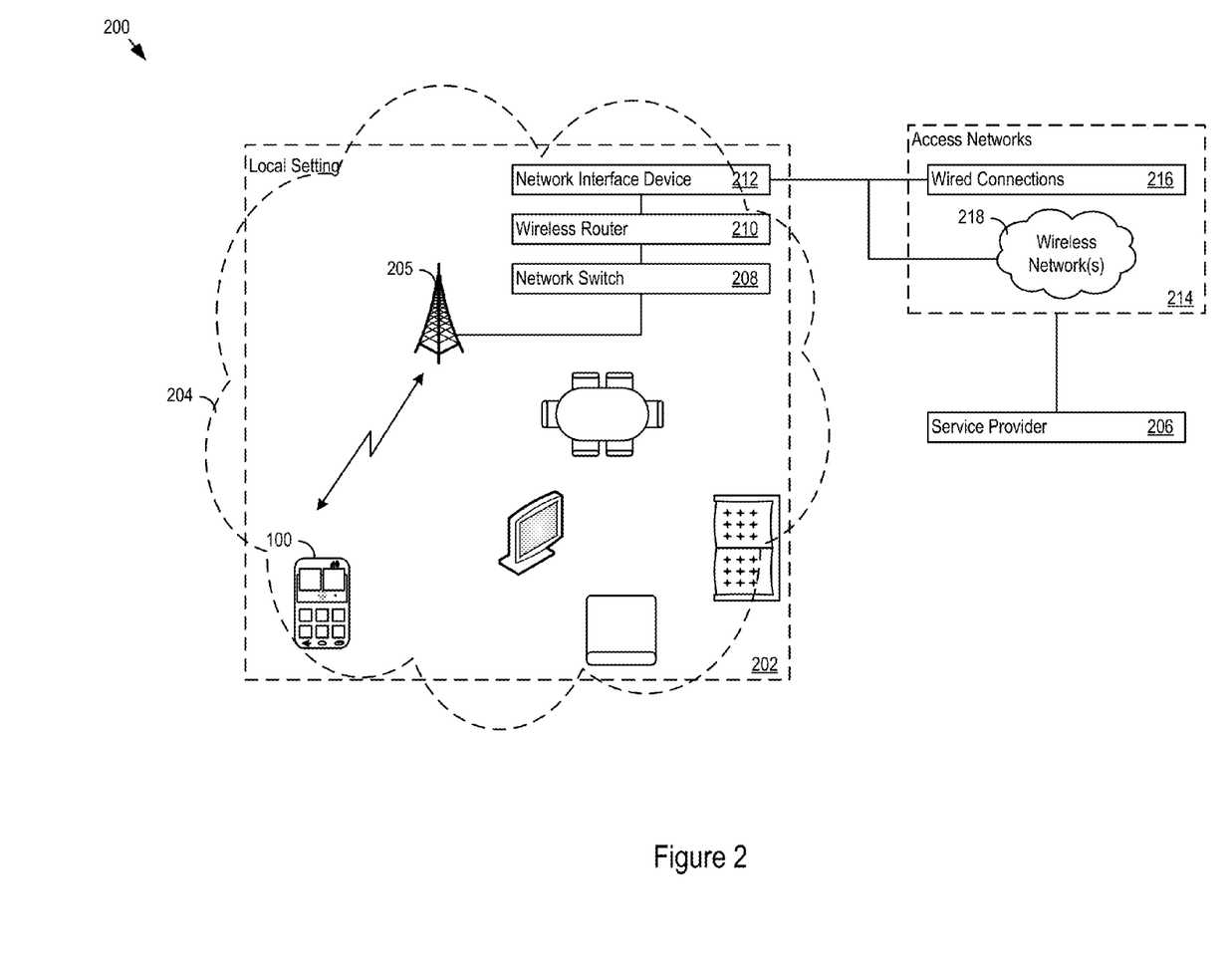
FIG. 2 shows an example architecture for a local setting with a femtocell.

FIG. 2 shows an example architecture 200 for a local setting 202 covered by a femtocell 204. A femtocell basestation 205 (e.g., a low transmit power eNB) generates the femtocell 204. The local setting 202 may be a home or office, as examples, in which one or more femtocells 204 provide cellular coverage within the local setting 202. The femtocell basestation 205 may perform the functions of a cellular basestation, for example, according to the 3GPP standard.

As just one example, the femtocell 204 may have footprint range from about 10 s to 100 s of meters, e.g., between 10 and 200 m. In a residential environment, the femtocell 204 may support, e.g., 2 to 4 active calls. The femtocell 204 increases the coverage area provided by macrocells generated by full scale outdoor base stations, and may improve data throughput and voice quality. The femtocell 204 may further reduce uplink transmission power requirements from the UE 100, because the femtocell basestation 205 is much closer, and may therefore improve the battery life of the UE 100.

In order to distinguish between a macrocell and a femtocell, the cell information broadcast by the femtocell may include a femtocell identity (given, e.g., by the csg-Identity field in the System Information Block 1 (SIB1)) and optionally a femtocell indication flag set to TRUE (given, e.g., in the csg-Indication field in SIB1). In some cases, the femtocells may have a valid femtocell identity and a femtocell indication flag set to FALSE. Such cells are referred to as hybrid cells. A hybrid cell would act as a femtocell for the users authorized for connection to that femtocell and as a normal non-femtocell cell to other UEs.

Most of the broadcast (beacon) information sent by a femtocell is similar to that sent by a macrocell, except for the femtocell identity and femtocell indication flag mentioned above. In addition, with the introduction of femtocells, both femtocells and macrocells can optionally broadcast a list identifying known femtocell neighbor cells to help the UE 100 do cell reselection to such femtocells if the cellular radio environment warrants the reselection and if the UE 100 has a subscription to the neighboring femtocell.

The femtocell basestation 205 may connect to the service provider 206 in many different ways. In the example shown in FIG. 2, the femtocell basestation 205 connects to a port on a network switch 208. The network switch 208 connects to a wireless router 210 that also provides WiFi connectivity in the local setting 202. A network interface device 212 provides a connection to the backbone (e.g., internet service) for the local setting 202. The network interface device 212 may be a cable modem, DSL modem, T1 or T3 line, satellite transceiver, optical network interface, or other network interface device. The network interface device 212 and, therefore, the femtocell 204, connect through the access network(s) 214 to the service provider 206. The access networks may include wired connections 216, e.g., T4 or T5 lines, and wireless connections 218, e.g., microwave or satellite links.

The configuration of the femtocell 204 may include a specification of UEs that are allowed to connect to the femtocell 204 and receive service. The specification of UEs may be done in many different ways, such as by creating a whitelist of allowable phone numbers, International Mobile Station Equipment Identity (IMEI) numbers, or other identifiers. The set of UEs that have access to the femtocell 204 may therefore be closely controlled by the owner or operator of the femtocell 204. For example, in a home setting, the homeowner may configure the femtocell 204 to allow connections to the group of UEs carried by family members, friends, guests, or any other individuals. The group of UEs that have access to the femtocell 204 may be referred to as a Closed Subscriber Group (CSG).

Figure 3:
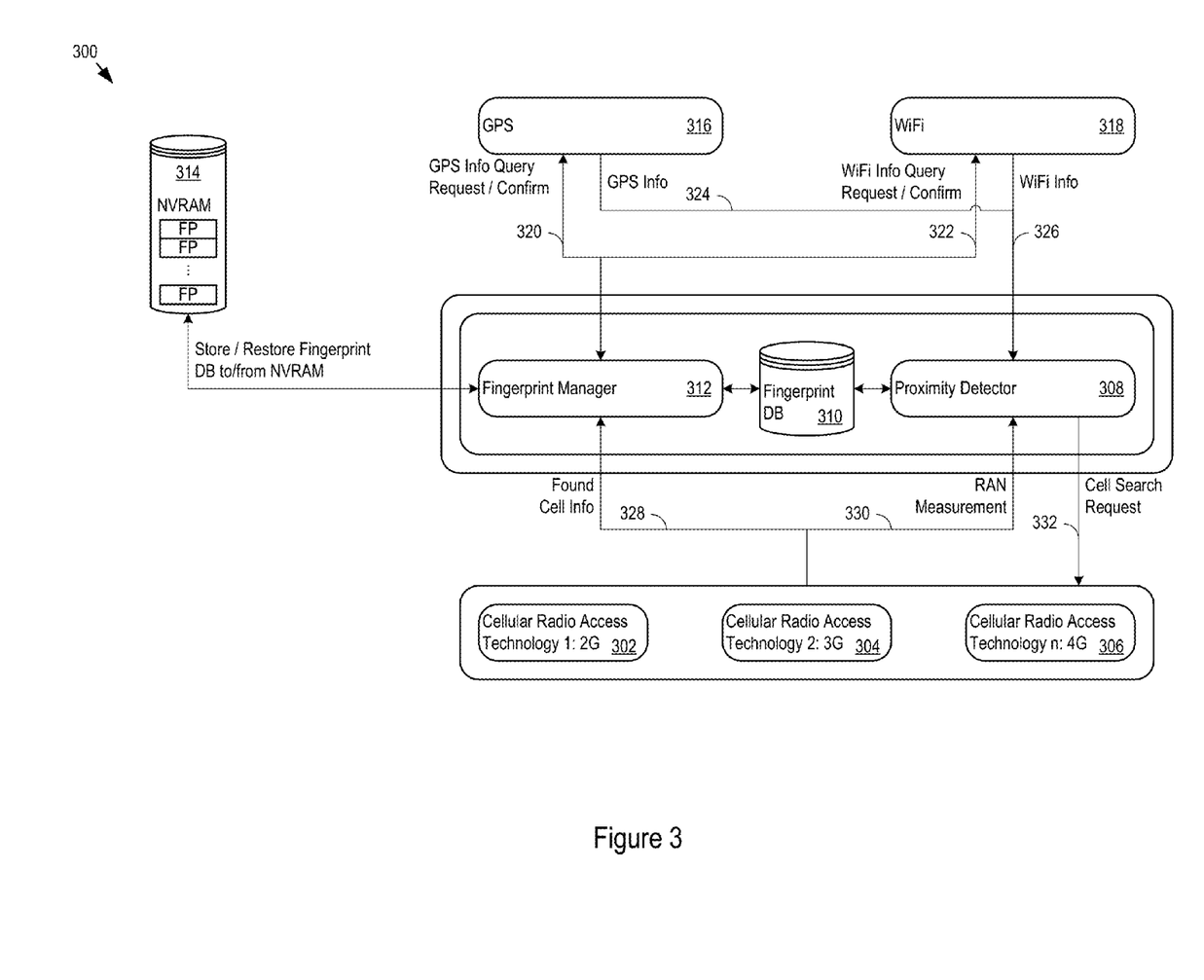
FIG. 3 shows an example fingerprinting architecture.

FIG. 3 shows an example fingerprinting architecture 300. The architecture 300 is one example of the type of system architecture that the UE 100 may implement for creating, updating, removing and otherwise managing fingerprints. There are many other ways to implement such an architecture, and the UE 100 is not limited to the architecture 300.

Note that the operator of the UE 100 may select which cell to prioritize for future selection by the UE 100. The cell may be a femtocell. In that case, the UE 100 may record characterizing information for the femtocell from any available sources. The UE 100 employs the characterizing information to subsequently determine whether the UE 100 is proximate to the femtocell, and if so, trigger an Autonomous Search Function (ASF) in an attempt to find and connect to the femtocell. The collection of characterizing information for the femtocell may be referred to as a fingerprint for that femtocell.

The fingerprint may contain multiple components, e.g., measurement inputs, that capture the characterizing information. The fingerprint components may include, as a few examples:

Global Positioning System (GPS) position;

WiFi signal strengths in the measurable environment;

WiFi Service Set Identifiers (SSIDs) for available or connected WiFi access points in the measureable environment;

timing measurements to neighbor cells;

Radio Access Technologies (RATs) used by nearby macrocells or femtocells, e.g., whether Global System for Mobile Communications (GSM), Universal Mobile Telecommunications System (UMTS), or Long Term Evolution (LTE);

BT and NFC signal strength, identifiers, or other BT or NFC environmental characteristics, and BT or NFC events, such as BT or NFC pairing and communication events (e.g., the fingerprint may include information identifying the most recent BT or NFC event for the femtocell that is being fingerprinted);

Public Land Mobile Network Identifier (PLMN ID);

Global Cell Identity, such as an Evolved Universal Mobile Telecommunications System Terrestrial Radio Access Network (E-UTRAN) Cell Global Identifier (ECGI): the 28-bit cell identity value in combination with a PLMN-identity. The Global cell identity may be useful, e.g., when physical cell IDs are reused;

cell power level and signal quality measurements;

identifying information for nearby macrocells or femtocells from which the UE 100 can receive signals;

Downlink frequency to the UE 100, as examples, an Absolute Radio Frequency Channel Number (ARFCN), a Universal Mobile Telecommunications System (UMTS) Terrestrial Radio Access (UTRA) ARFCN (UARFCN), or Evolved Universal Terrestrial Radio Access (EUTRA) ARFCN (EARFCN);

other cell information, such as the Physical Cell Identity (PCI) obtained during cell synchronization, Primary Scrambling Code (PSC), and Base Station Identity Code (BSIC); Note that the cell information may be a scrambling code, e.g., a 3GPP scrambling code or an LTE PCI, but that other implementations may use other types of cell information that may, by itself or in combination with other information, distinguish cells or indicate a cell type (e.g., a femtocell type or a macrocell type);

Reference Signal Received Power (RSRP) information, e.g., the average power of Resource Elements (REs) carrying Reference Signals (RSs) over a specified bandwidth;

Received Signal Strength Indicator (RSSI) information, e.g., the received wide-band power, potentially across all received symbols and including interference and noise; and Time Delay of Arrival (TDoA) to other cells.

The UE 100 analyzes the fingerprint against measurements to determine whether the UE 100 is near a femtocell. The UE 100 may, for example, compare measurements of the environment (e.g., the currently visible SSIDs and macrocells) against the fingerprint to find a match to all or part of the fingerprint. The UE 100 may determine whether a match exists based on predetermined decision criteria that specify which parts, how much, and/or to what degree, the fingerprint components should agree with the measurements to be considered a match.

In support of fingerprinting, the architecture 300 interacts with one or more cellular RATs. In the example in FIG. 3, the RATs include a 2G RAT 302, a 3G RAT 304, and a 4G/LTE RAT 306. There may be any number or type of such RATs. The architecture 300 also includes a proximity detector 308. The proximity detector 308 may perform the analysis described above to determine whether current measurements match a fingerprint stored in the fingerprint database 310. Note that any of the RATs may return information to the fingerprint manager 312 and proximity detector 308. For example, the RATs may return cell information 328 about the macrocells and femtocells found in the vicinity, and Radio Access Network (RAN) measurements 330 that characterize the environment around the UE 100. The fingerprint manager 312 and proximity detector 308 may issue requests to the RATs as well. For example, the proximity detector 308 may initiate a cell search request 332. The cell search request 332 may be in response to finding a matching fingerprint.

The architecture 300 also includes a fingerprint manager 312. The fingerprint manager 312 may handle the storage, recovery, addition, modification, deletion, or other management tasks on the fingerprints in the fingerprint database 310. Note that the architecture 300 may include additional storage 314 for the fingerprints, such as Non-volatile Random Access Memory (NVRAM). As a result, the saved fingerprints may be retrieved and used when the UE 100 completes its power-on procedures after a power-down. The fingerprints are labeled with the abbreviation 'FP' in FIG. 3.

As explained above, the fingerprints may include components of many different types. To that end, the architecture 300 may also interact with the GPS logic 316, the WiFi logic 318, or other logic. The fingerprint manager 312 may issue GPS information queries 320 or WiFi information queries 322 to the GPS logic 316 and WiFi logic 318. The GPS logic 316 and WiFi logic 318 return GPS information 324 (e.g., location coordinates or timing information) and WiFi information (e.g., SSIDs) to the proximity detector 308.

As previously explained, the proximity detector 308 may detect proximity to a previously fingerprinted cell based on one or more inputs including, as examples, RAT, WiFi, and GPS inputs. The proximity detector 308 may receive measurements periodically or on an event based basis. The proximity detector 308 may also issue measurement queries from different available component sources, such as RAT1-RATn, WiFi, and GPS. The proximity detector 308 attempts to match the measurement results against fingerprints in the fingerprint database 310 that the architecture 300 recorded for previously visited cells.

The proximity detector 308 may use the measurement inputs in a phased way. For example, the proximity detector 308 may determine a coarse match or lock based on RAN measurements. The proximity detector 308 may then obtain further measurement inputs, such as by determining whether GPS is enabled, and if so, checking proximity to a particular location specified in the fingerprint. As another example, the proximity detector 308 may determine proximity to the cell by matching a WiFi SSID, or taking additional RAN macrocell information, and may further take steps to confirm that the WiFi router has not moved or changed.

The proximity detector 308 may indicate a detection confidence level which may be used to perform a search for the cell in a power optimized way. That is, the confidence level may affect whether a search is done at all, and if so, how often and when the search is executed.

The proximity detector 308 may take into account other factors to determine whether the UE 100 will start searching for a fingerprinted cell. Examples of the other factors include cell size and velocity of travel. For instance, the proximity detector 308 may not indicate a proximity detection when a fingerprinted cell is less than a threshold size, and the UE 100 is determined to be travelling at a high speed that exceeds a speed threshold.

When the UE 100 is in Idle mode, the proximity detector 308 may trigger the currently active RAT to begin searching for (e.g., measuring) the target cell when proximity is detected. In connected mode the UE 100 may indicate proximity through signaling with the network controller 150, e.g., in the control channel 152. In connected mode, the network controller 150 may then instruct the UE 100 to attempt to connect to the target cell (the cell for which a fingerprint match was found).

The fingerprint manager 312 may add, remove, and update fingerprints based on various inputs. The inputs may include, as examples: failure to find a fingerprinted cell after search is triggered, successful reselection to fingerprinted cell, and the time to find fingerprinted cell after search is triggered.

The fingerprint manager 312 may update fingerprints wholly or partially. For instance, the fingerprint manager 312 may update, delete, or add measurements for some macrocells without affecting other components in the fingerprint. The fingerprint manager 312 may generate a fingerprint when the UE 100 enters a femtocell. In that regard, the fingerprint manager 312 may execute, for example, a full network scan to determine visible macrocells in all RATs, and, if available, WiFi, and GPS measurements. As another example, the fingerprint manager 312 may generate the fingerprint from neighbor cell measurements that the UE 100 performs as part of its normal housekeeping operations for maintaining cell connectivity, prior to reselecting to the fingerprinted cell.

The architecture 300 may use the native RAT for the matched fingerprinted cell to perform the search for the matched cell. That is, the RAT (or any other search logic) may attempt to find the matched cell when the proximity detector 308 instructs it to do so. In that regard, the RAT may scan the frequencies associated with the matched cell in an attempt to find transmissions from the matched cell.

The RAT may take into account the proximity detection confidence level indicated by the proximity detector 308 when determining whether, when, and how often to search. For instance, a lower confidence may result in a less frequent search, helping to preserve battery life.

To confirm that the detected transmissions originate from a cell that is in fact the cell that the UE 100 is searching for, the search logic may acquire system information from the target cell. The UE 100 may do so while still camped on an existing serving cell. For instance, the UE 100 may perform background System Information Block (SIB) acquisition. The SIBs provide identity information for the transmitting cell. The UE 100 may ensure that the cell identity matches that of the fingerprinted cell. This may help to avoid frequent failed reselection attempts. The UE 100 may also use this pre-emptive SIB acquisition to determine that the target cell meets any specified suitability criteria before the cell reselection attempt is performed, by checking SIB data against the criteria.

Alternatively, the UE 100 may choose to not perform background SIB acquisition. Instead, the UE 100 may trigger cell reselection directly without prior confirmation that the measured cell is the correct preferred cell. In this case the UE 100 may store cell selection parameters (e.g., from the system information) as part of the fingerprint when initially fingerprinting the cell. The UE 100 may use these parameters to perform pre-suitability-checking of the target cell before deciding whether a cell reselection will be performed. If the UE 100 decides to reselect and subsequently discovers that the cell is actually not the correct cell, e.g., based on checking the cell identity, Public Land Mobile Network (PLMN) identity, or other information, the UE 100 may bar this cell from future connection attempts. The bar may last, e.g., for as long as the cell remains visible or for a predetermined time.

Mobility State Dependent System Information Block Acquisition

Note that some UEs, such as the UE 100, may not support femtocell connectivity. Similarly, a femtocell capable UE may have an empty whitelist of femtocells to which it may connect. It may be beneficial for such UEs to avoid spending time and energy scanning for and measuring femtocell frequencies. However, the range of PCIs used by femtocells is transmitted by the femtocells, and only optionally by the macrocells. As a result, a non-femtocell supporting UE, such as the UE 100, may not be able to obtain information about femtocells to skip during its frequency scanning procedures of macrocells.

In one implementation, when the UE 100 obtains information that indicated that a cell is a femtocell (e.g., by reading a System Information Block such as SIB1, transmitted by the cell), the UE 100 need not immediately disconnect, as may usually occur when the UE 100 detects an unsuitable cell. Instead of disconnecting, the UE 100 may stay connected and continue to receive information from the femtocell until the UE 100 receives the PCI range information (or other femtocell identifying information), and afterwards disconnect. This is referred to as foreground mode acquisition of the PCI range information. The UE 100 may obtain the PCI range information from the csg-PhysCellId-Range field of the SIB4, as one example.

Assume, for example, that nearby cells A, B, C, and D are configured as follows:

Femtocell A—PCI 205; SIB1 indicates csg-Indication=TRUE, csg-Identity=43, PLMN-id=31038, cellIdentity=7500; SIB4 indicates CSG PCI range is 200-263.

Femtocell B—PCI 240; SIB1 indicates csg-Indication=TRUE, csg-Identity=44, PLMN-id=31038, cellIdentity=8500; SIB4 indicates CSG PCI range is 200-263.

Femtocell C—PCI 245, SIB1 indicates csg-Indication=TRUE, csg-Identity=45, PLMN-id=31038, cellIdentity=9500; SIB4 indicates CSG PCI range is 200-263.

Macrocell D—PCI 8, SIB1 indicates csg-Indication=FALSE, csg-Identity absent, PLMN-id=31038, cellIdentity=2000; SIB4 does not contain CSG PCI range.

Instead of the UE 100 trying to connect in this example sequence: femtocell A, then femtocell B, the femtocell C, then successfully to macrocell (non-femtocell) D, the UE 100 may instead read the PCI range information from the femtocell A, recognize from the PCI range information and from the PCI values transmitted by femtocell B and femtocell C that femtocell B and femtocell C are femtocells, and skip the connection attempts to femtocells B and C.

In more detail, the UE 100 performs cell synchronization (e.g., at L1) and obtains PCI 205 for femtocell A. The UE 100 then acquires the Master Information Block (MIB) and SIB1. From the csg-Indication and csg-Identity values, the UE 100 determines the cell is a femtocell. The UE 100, using foreground mode acquisition, obtains SIB4 from femtocell A and thereby obtains the PCI range 200-263. As the UE 100 continues to search for macrocells, the UE 100 synchronizes to femtocell B, obtains the PCI value 240, which is within the PCI range, and skips further acquisition of information from femtocell B (e.g., the UE 100 does not spend the resources to obtain the MIB or SIB1). Similarly, the UE 100 obtains PCI 245 from synchronizing to femtocell C, and may then also skip MIB and SIB1 acquisition from femtocell C. When the UE 100 obtains PCI 8 from macrocell D, the UE 100 continues with MIB and SIB1 acquisition from macrocell D, and may then camp onto macrocell D.

In another implementation, the UE 100 may disconnect from the femtocell A immediately, but may store the femtocell information (e.g., RAT, scrambling code, and frequency). Then, when the UE 100 is camped on a non-femtocell and the UE 100 is Idle, the UE 100 may tune to the femtocell A and receive the PCI range information transmitted by the femtocell A. This is referred to as background mode acquisition of the PCI range information.

Figure 4:
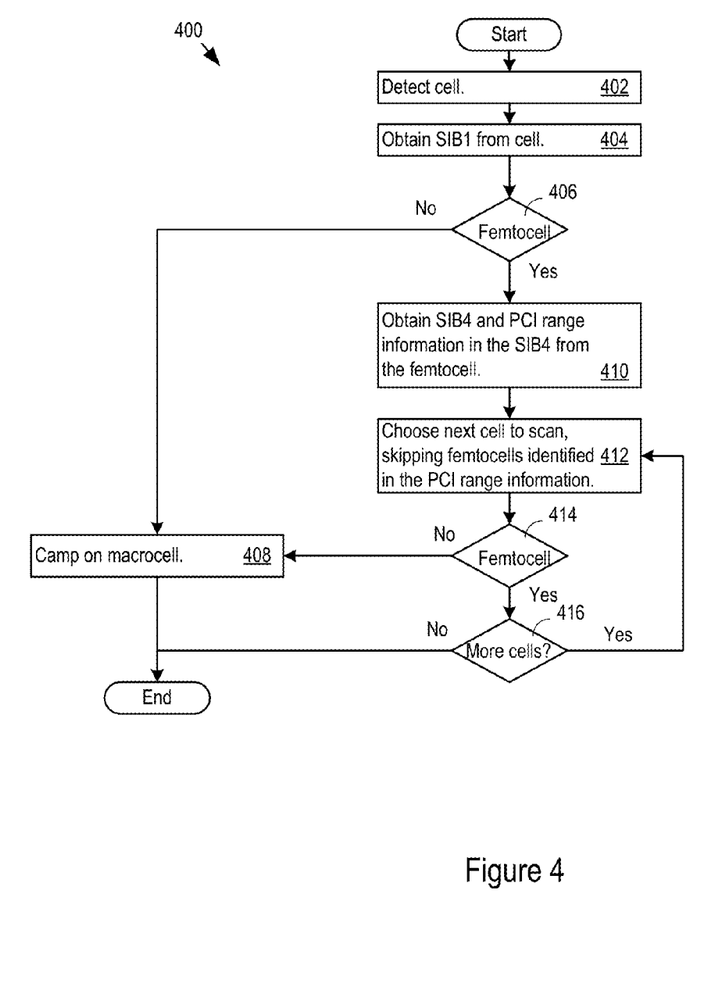
FIG. 4 shows logic for foreground SIB4 acquisition.

Expressed another way, the UE 100 may obtain the PCI range information in the SIB4 either through foreground mode acquisition or background mode acquisition. FIG. 4 shows logic 400 for foreground mode SIB4 acquisition, initially assuming that the PCI range information is unknown. A UE that does not support femtocell connectivity may implement the logic 400. The UE 100 detects a cell (402), e.g., during cell selection or reselection, and obtains cell information, such as any combination of a femtocell indication, identity field, or other information (404). If the cell is a macrocell (406), the UE 100 may camp on the macrocell (408). As one specific example, the UE 100 may determine that a cell is a macrocell or femtocell by checking the csg-Indication and csg-Identity fields provided in the SIB1.

If the cell if not a macrocell, the UE 100 continues receiving information from the femtocell, e.g., without immediately disconnecting. In particular, the UE 100 obtains the PCI range information, e.g., from the SIB4 (410). Then, the UE 100 may choose the next cell to scan, skipping femtocells identified in the PCI range information obtained from the SIB4 (412). Using the example PCI range 200-263 given above, for instance, the UE 100 may skip searching for any cell that is using a PCI between 200 and 263, inclusive. If a macrocell is found (414) in the search, the UE 100 may camp on the macrocell (408). Otherwise, the UE 100 may continue to search other cells, when any additional cells remain to examine (416).

Figure 5:
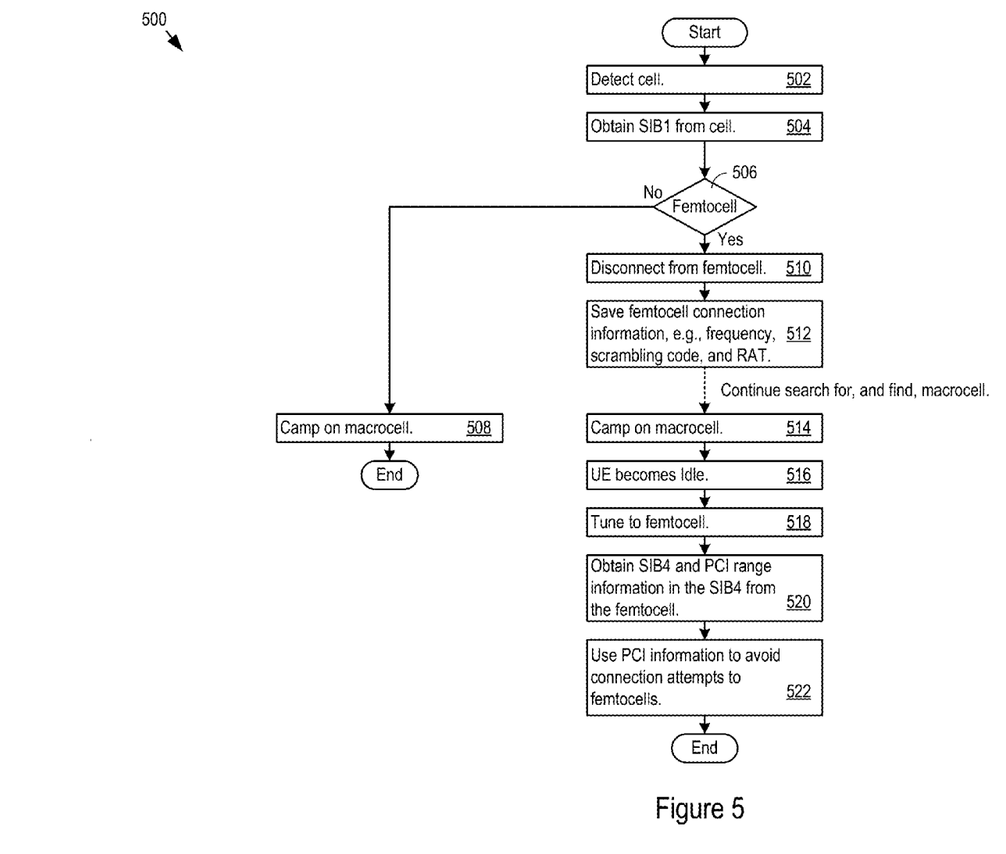
FIG. 5 shows logic for background SIB4 acquisition.

FIG. 5 shows logic 500 for background mode SIB4 acquisition. A UE that does not support femtocell connectivity may implement the logic 500. The UE 100 detects a cell (502), e.g., during cell selection or reselection, and obtains cell information, e.g., the femtocell identity and femtocell indication fields from the SIB1 (504). If the cell is a macrocell (506), the UE 100 may camp on the macrocell (508).

Otherwise, the UE 100 disconnects from the femtocell, e.g., without continuing to receive other SIBs (510). However, the UE 100 saves the femtocell connection information, such as the femtocell downlink frequency, scrambling code, and RAT (512). Over time, the UE 100 will find and camp on a macro cell (514), and the UE 100 will typically become Idle at various times (516) while camped on that macrocell. When Idle the UE 100 is not transmitting or receiving information for an active voice or data connection from the basestation, though the UE 100 remains camped on the macrocell.

While the UE 100 is Idle, the UE 100 may perform background mode cell information acquisition. In particular, the UE 100 may tune the RF interface to the femtocell corresponding to the previously saved femtocell connection information (518). The UE 100 may then receive the PCI range information, e.g., by receiving the SIB4 (520). This way, the UE 100 does not cause delay with the normal cell selection or reselection procedure, and may be better able to avoid missing incoming pages. The UE 100 may use the PCI range information to determine which PCIs correspond to femtocells, and thereby avoid connection attempts to femtocells (522) as described above.

Note that the UE 100 may decide whether to use foreground mode acquisition or background mode acquisition responsive to a mobility state of the UE 100. For instance, the logic in the UE 100 may determine a mobility state and decide to execute the foreground mode acquisition when the mobility state exceeds a mobility threshold. Similarly, the logic may decide to execute the background mode acquisition when the mobility state does not exceed a mobility threshold. There may be different mobility thresholds for the foreground mode acquisition and background mode acquisition options, and the thresholds may be stored in the memory 120 for retrieval, and may be statically set or dynamically modified.

When the mobility state exceeds the mobility threshold, that may indicate that the UE 100 is moving quickly. If the UE 100 is moving quickly, then there may be a risk of missing the SIB4 from a currently visible femtocell. As a result, foreground mode acquisition may be preferable, in order that the UE 100 does not move out of range before the communication interface 112 can obtain the PCI range information by receiving the SIB4.

In contrast, when the mobility state does not exceed the mobility threshold, that may indicate that the UE 100 is moving relatively slowly. If the UE 100 is moving relatively slowly, then there may be less of a risk of missing the SIB4 from a currently visible femtocell. As a result, background mode acquisition may be preferable, because it is less likely that the UE 100 will move out of range before the communication interface 112 can camp on the macrocell and during a later opportunity retune the RF interface to the femtocell to obtain the PCI range information.

Note that cell information that facilitates distinguishing the cell type may include a scrambling code, e.g., a 3GPP scrambling code, a physical cell identity, e.g., a LTE physical cell identity, or another type of data. Note also that although the specific example of PCI range information in the SIB4 was given above, other cellular implementations may provide femtocell distinguishing information in different ways using different messages that the UE 100 may obtain in either foreground mode acquisition or background mode acquisition. More generally, the UE 100 may receive cell type distinguishing or characterizing information from any source (e.g., a macrocell of femtocell) that the UE 100 may use to determine whether a cell is of a certain type (e.g. a femtocell, macrocell, hybrid cell, or other cell type). For instance, when the cell type distinguishing information is PCI range information that specifies a set of PCIs assigned to femtocells, the UE 100 may determine whether cell information, such as a PCI obtained during cell synchronization, lies within the specified PCI range in order to ascertain whether the cell type is a femtocell. As another example, the csg-Identity and csg-Indication fields in SIB1 may serve as cell information that distinguishes between a macrocell and a femtocell.

The UE 100 may determine the mobility state in many different ways. For instance, the UE 100 may determine the mobility state according to the 3GPP specification, e.g., Sections 5.2.4.3 and 5.5.6.2 in 3GPP 36.304 Release 10. Then, a high or medium mobility state may cause the logic in the UE 100 to use foreground mode acquisition, while a normal mobility state may cause the logic in the UE 100 to use background mode acquisition. In other implementations, a high mobility state may result in foreground mode acquisition, while a medium or normal mobility state may result in background mode acquisition. Any UE may implement other mappings of mobility states to acquisition mode.

In other implementations, the UE 100 may determine a mobility state from GPS measurements. The UE 100 may obtain velocity directly from the GPS measurements, or process the GPS measurements to determine velocity of the UE 100. In other implementations, the UE 100 velocity may be determined from Doppler shift, e.g., of the serving cell known baseline transmit frequency compared to that received at the UE 100. Other examples of velocity determination include estimation based on rate of change of macrocell RSSI, or rate of change of macrocell TDoA. The UE 100 may map velocity to a mobility state (e.g., high or low mobility), and may compare the mobility state to thresholds that determine whether to use foreground mode acquisition (high mobility) or background mode acquisition (low mobility) for the PCI range information.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

Various implementations have been specifically described. However, many other implementations are also possible.

What is claimed is:

1. A method comprising:
   receiving, at a user equipment, an indicator from a first cell, the indicator indicating a femtocell cell type of the first cell;
   determining that the femtocell cell type is unsupported by the user equipment;
   responsive to determining that the femtocell cell type is unsupported, receiving, at the user equipment, a system information block (SIB) of the first cell from the first cell comprising a physical cell identity (PCI) range for other cells other than the first cell that each has the femtocell cell type of the first cell that is unsupported; and
   in scanning for cells to connect to, accessing from a second cell a PCI value of the second cell, and skipping the second cell and further acquisition of system information transmitted by the second cell responsive to determining that the PCI value is within the PCI range comprised in the SIB of the first cell.

2. The method of claim 1, further comprising collecting the SIB while tuned to the first cell.

3. The method of claim 1, further comprising receiving the SIB transmitted by the first cell while camped onto a cell type that the user equipment does support.

4. The method of claim 1, further comprising collecting the SIB in a foreground mode in response to a mobility state of the user equipment, the mobility state characterizing current motion of the user equipment.

5. The method of claim 4, where collecting the SIB in a foreground mode comprises:
   obtaining the SIB while tuned to a cell having the femtocell cell type, as the user equipment searches for a cell type that the user equipment does support.

6. The method of claim 1, further comprising collecting the SIB in a background mode in response to a mobility state determination for the user equipment.

7. The method of claim 6, where collecting the SIB in a background comprises:
   obtaining the SIB while camped to a cell type that the user equipment does support, by tuning while the user equipment is Idle to a cell having a macro or other cell type.

8. The method of claim 1, where the cell type characteristic information comprises specific physical cell identities.

9. The method of claim 1, wherein skipping further acquisition of system information transmitted by the second cell comprises skipping acquisition of a system information block 1 (SIB1) and a system information block 4 (SIB4) from the second cell.

10. A system comprising:
    a radio frequency (RF) interface; and
    circuitry in communication with the RF interface, the circuitry configured to:
       determine that a femtocell cell type is unsupported;
       receive, from a first cell, an indicator indicating the femtocell cell type of the first cell that is determined to be unsupported;
       responsive to the indicator, obtain a system information block (SIB) of the first cell from the first cell with the RF interface, the SIB comprising a physical cell identity (PCI) range for cells other than the first cell that each has the femtocell cell type of the first cell that is unsupported;
       determine a next cell to which to attempt to connect; and
       after the next cell is identified, accessing from the next cell a PCI value of the next cell, and skipping the next cell and further acquisition of system information transmitted by the next cell responsive to determining that the PCI value is within the PCI range comprised in the SIB of the first cell.

11. The system of claim 10, where the circuitry is further configured to:
    tune the RF interface to the first cell to obtain the SIB.

12. The system of claim 11, where the circuitry is further configured to:
    tune the RF interface to obtain the SIB while camped on a supported cell type for the system.

13. The system of claim 10, where a supported cell type for the system comprises a macrocell cell type.

14. The system of claim 10, where the circuitry is further configured to:
    while tuned to the first cell, obtain the SIB during a search for a supported cell type for the system.

15. The system of claim 10, where the circuitry is further configured to:
    obtain system information while camped on a supported cell type for the system, by tuning to the first cell while the RF interface is idle.

16. The system of claim 10, where the RF interface is configured to:
    receive a system information message that includes the SIB.

17. A system comprising:
    a radio frequency (RF) interface;
    circuitry in communication with the RF interface, the circuitry configured to:
       determine that a femtocell cell type is unsupported;
       receive an indicator from a first cell that the first cell has the femtocell cell type;
       determine whether to execute foreground mode acquisition of characteristic information for the first cell, or to execute background mode acquisition of the characteristic information for the first cell, the characteristic information corresponding to a system information block (SIB) of the first cell from the first cell, comprising a physical cell identity (PCI) range for cells other than the first cell that each has the femtocell cell type of the first cell that is unsupported;
    for foreground mode acquisition:

tune the RF interface to the first cell having the femtocell cell type; and
responsive to the indicator, remain tuned to the first cell until the characteristic information for the first cell is received from the first cell;
for background mode acquisition:
tune the RF interface to a second cell, the second cell having a supported cell type; and
remain camped on the second cell until an opportunity arises to receive from the first cell;
responsive to the indicator and during the opportunity, tune the RF interface to the first cell;
receive the characteristic information from the first cell; and
return the RF interface to the second cell; and
in scanning for a cell to connect to, access from a different cell a PCI value of the different cell, and determine to skip the different cell and further acquisition of system information transmitted by the different cell responsive to determining that the PCI value is within the PCI range comprised in the SIB of the first cell.

18. The system of claim 17, where the circuitry is further configured to:
determine a mobility state;
execute the foreground mode acquisition when the mobility state exceeds a mobility threshold; and
execute the background mode acquisition when the mobility state does not exceed the mobility threshold.

19. The system of claim 18, where the mobility threshold comprises a speed threshold.

20. The system of claim 17, where the circuitry is further configured to skip further acquisition of system information transmitted by the different cell by skipping acquisition of a system information block 1 (SIB1) and a system information block 4 (SIB4) from the different cell.

* * * * *